(12) United States Patent
Chiang et al.

(10) Patent No.: US 12,114,015 B2
(45) Date of Patent: Oct. 8, 2024

(54) METHODS AND APPARATUS FOR RESTRICTED SECONDARY TRANSFORM AND SIGNALING THEREOF IN IMAGE CODING

(71) Applicant: HFI Innovation Inc., Zhubei (TW)

(72) Inventors: Man-Shu Chiang, Hsinchu (TW); Tzu-Der Chuang, Hsinchu (TW); Chih-Wei Hsu, Hsinchu (TW); Ching-Yeh Chen, Hsinchu (TW); Zhi-Yi Lin, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 156 days.

(21) Appl. No.: 17/783,954

(22) PCT Filed: Dec. 10, 2020

(86) PCT No.: PCT/CN2020/135303
§ 371 (c)(1),
(2) Date: Jun. 9, 2022

(87) PCT Pub. No.: WO2021/115387
PCT Pub. Date: Jun. 17, 2021

(65) Prior Publication Data
US 2022/0385946 A1 Dec. 1, 2022

Related U.S. Application Data

(60) Provisional application No. 62/959,938, filed on Jan. 11, 2020, provisional application No. 62/949,505, (Continued)

(51) Int. Cl.
H04N 19/70 (2014.01)
H04N 19/176 (2014.01)
(Continued)

(52) U.S. Cl.
CPC .......... *H04N 19/70* (2014.11); *H04N 19/176* (2014.11); *H04N 19/186* (2014.11); *H04N 19/96* (2014.11)

(58) Field of Classification Search
CPC ...... H04N 19/96; H04N 19/70; H04N 19/186; H04N 19/12; H04N 19/157; H04N 19/176
See application file for complete search history.

(56) References Cited

U.S. PATENT DOCUMENTS 9,426,466 B2    8/2016  Van der Auwera et al.
10,873,762 B2  12/2020  Zhao et al.
(Continued)

FOREIGN PATENT DOCUMENTS

| CN | 104509113 A | 4/2015 |
| CN | 108141597 A | 6/2018 |
| CN | 110419218 A | 11/2019 |

OTHER PUBLICATIONS

Chinese language office action dated Mar. 11, 2023, issued in application No. CN 202080085700.9.
(Continued)

*Primary Examiner* — Neil R Mikeska
(74) *Attorney, Agent, or Firm* — McClure, Qualey & Rodack, LLP

(57) ABSTRACT

In a method and apparatus for video coding using Low-Frequency Non-Separable Transform (LFNST) mode, a coding unit (CU) is partitioned into one or more transform blocks (TBs). A syntax is determined at an encoder side or at a decoder side, where the determining step is performed by signaling the syntax at the encoder side or by parsing the syntax at the decoder side if one or more conditions are satisfied. The syntax indicates whether the LFNST mode is applied to the current CU and/or which LFNST kernel is applied when the LFNSF is applied, and the conditions
(Continued)

comprise a target condition corresponding to that all target TBs in a target TB set have a TS mode indication as false, and the target TB set is selected from the TBs in the current CU. The current CU is encoded or decoded according to the LFNST mode.

19 Claims, 2 Drawing Sheets

Related U.S. Application Data filed on Dec. 18, 2019, provisional application No. 62/947,057, filed on Dec. 12, 2019.

(51) Int. Cl.
*H04N 19/186* (2014.01)
*H04N 19/96* (2014.01)

(56) References Cited

U.S. PATENT DOCUMENTS

| | | | |
|---|---|---|---|
| 11,330,302 B2* | 5/2022 | Jung | H04N 19/176 |
| 2014/0169452 A1 | 6/2014 | Lim et al. | |
| 2017/0094313 A1* | 3/2017 | Zhao | H04N 19/176 |
| 2018/0199062 A1 | 7/2018 | Zhang et al. | |
| 2020/0322636 A1* | 10/2020 | Egilmez | H04N 19/70 |
| 2021/0076070 A1* | 3/2021 | Jung | H04N 19/132 |
| 2021/0120269 A1 | 4/2021 | Chen et al. | |
| 2022/0345744 A1* | 10/2022 | LeLeannec | H04N 19/11 |
| 2022/0394257 A1* | 12/2022 | Koo | H04N 19/122 |
| 2022/0394258 A1* | 12/2022 | Koo | H04N 19/122 |
| 2023/0063796 A1* | 3/2023 | Koo | H04N 19/18 |
| 2023/0128355 A1* | 4/2023 | Koo | H04N 19/132 |
| | | | 375/240.02 |

OTHER PUBLICATIONS

Egilmez, H., et al.; "Description of Core Experiment 6 (CE6): Transforms and transform signalling;" Joint Video Experts Team (JVET) of ITU-T SG 16 WP 3 and ISO/IEC JTC 1/SC 29/WG 11; Jul. 2019; pp. 1-9.

International Search Report and Written Opinion dated Mar. 17, 2021, issued in application No. PCT/CN2020/135303.

Chiang, M.S., et al.; "CE6-related: Constraint and simplification for LFNST signalling;" Joint Video Experts Team (JVET) of ITU-T SG 16 WP 3 and ISO/IEC JTC 1/SC 29/WG 11; Jul. 2019; pp. 1-4.

Chiang, M.S., et al.; "LFNST signalling cleanup with TS checking;" Joint Video Experts Team (JVET) of ITU-T SG 16 WP 3 and ISO/IEC JTC 1/SC 29/WG 11; Jan. 2020; pp. 1-10.

Chiang, M.S., et al.; "CE6-related: Latency reduction for LFNST signalling;" Joint Video Experts Team (JVET) of ITU-T SG 16 WP 3 and ISO/IEC JTC 1/SC 29/WG 11; Jul. 2019; pp. 1-9.

Chinese language office action dated Jan. 14, 2022, issued in application No. TW 109143841.

Ainema, J.; "CE6-related: Simplified LFNST;" Joint Video Experts Team (JVET) of ITU-T SG 16 WP 3 and ISO/IEC JTC 1/SC 29/WG 11; Jul. 2019; pp. 1-5.

Extended European Search Report dated Nov. 20, 2023, issued in application No. EP 20899036.6.

Chiang, M.-S., et al.; "CE6-related: Constraint and simplification for LFNST signaling;" Joint Video Experts Team (JVET) of ITU-T SG 16 WP 3 and ISO/IEC JTC 1/SC 29/WG 11; Jul. 2019; pp. 1-4.

Tsukuba, T., et al.; "CE8: Chroma Transform Skip (CE8-3.2);" Joint Video Experts Team (JVET) of ITU-T SG 16 WP 3 and ISO/IEC JTC 1/SC 29/WG 11; Jul. 2019; pp. 1-8.

* cited by examiner

METHODS AND APPARATUS FOR RESTRICTED SECONDARY TRANSFORM AND SIGNALING THEREOF IN IMAGE CODING

CROSS REFERENCE TO RELATED APPLICATIONS

The present invention claims priority to U.S. Provisional Patent Application, Ser. No. 62/947,057, filed on Dec. 12, 2019, U.S. Provisional Patent Application, Ser. No. 62/949,505, filed on Dec. 18, 2019, and U.S. Provisional Patent Application, Ser. No. 62/959,938, filed on Jan. 11, 2020. The U.S. Provisional Patent Applications are hereby incorporated by reference in their entireties.

FIELD OF THE INVENTION

The present invention relates to video coding. In particular, the present invention discloses restrictions on Low-Frequency Non-Separable Transform (LFNST) mode and signaling thereof.

BACKGROUND AND RELATED ART

High-Efficiency Video Coding (HEVC) is a new international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block, and each CU can be recursively split into four smaller CUs until the predefined minimum size is reached. Each CU contains one or multiple prediction units (PUs).

To achieve the best coding efficiency of hybrid coding architecture in HEVC, there are two kinds of prediction modes for each PU, which are intra prediction and inter prediction. For intra prediction modes, the spatial neighboring reconstructed pixels can be used to generate the directional predictions. There are up to 35 directions in HEVC. For inter prediction modes, the temporal reconstructed reference frames can be used to generate motion compensated predictions. There are three different modes, including Skip, Merge and Inter Advanced Motion Vector Prediction (AMVP) modes.

Transform Process

After prediction, the predicted residues for one CU are divided into transform units (TUs) and coded using transform and quantization. Like many other precedent standards, HEVC adopts Discrete Cosine Transform type II (DCT-II) as its core transform (primary transform) because it has a strong "energy compaction" property. In order to improve transform, Discrete Sine Transform (DST) was introduced to be used alternatively with DCT for oblique intra modes. For inter-predicted residue, DCT-II is the only transform used in current HEVC. However, the DCT-II is not the optimal transform for all cases. Discrete Sine Transform type VII (DST-VII) and Discrete Cosine Transform type IVIII (DCT-VIII) are proposed to replace DCT-II in some cases. Also multiple transform selection (MTS) scheme is used for residual coding for both intra and inter coded blocks. It utilizes multiple selected transforms from the DCT/DST families other than the current transforms in HEVC. The newly introduced transform matrices is DCT-VIII. In VVC, Multiple transform selection (MTS) for core transform is described as follows.

In addition to DCT-II which has been employed in HEVC, a Multiple Transform Selection (MTS) scheme is used for residual coding inter and/or intra coded blocks. It uses multiple selected transforms from the DCT8 (DCT-VIII)/DST7(DST-VII). The newly introduced transform matrices are DST-VII and DCT-VIII. The following Table 1 shows the basis functions of the selected DST/DCT.

TABLE 1

Transform basis functions of DCT-II/VIII and DSTVII for N-point input

| Transform Type | Basis function $T_i(j)$, $i, j = 0, 1, \ldots, N-1$ |
|---|---|
| DCT-II | $T_i(j) = \omega_0 \cdot \sqrt{\frac{2}{N}} \cdot \cos\left(\frac{\pi \cdot i \cdot (2j+1)}{2N}\right)$ where, $\omega_0 = \begin{cases} \sqrt{\frac{2}{N}} & i = 0 \\ 1 & i \neq 0 \end{cases}$ |
| DCT-VIII | $T_i(j) = \sqrt{\frac{4}{2N+1}} \cdot \cos\left(\frac{\pi \cdot (2i+1) \cdot (2j+1)}{4N+2}\right)$ |
| DST-VII | $T_i(j) = \sqrt{\frac{4}{2N+1}} \cdot \sin\left(\frac{\pi \cdot (2i+1) \cdot (j+1)}{2N+1}\right)$ |

In order to keep the orthogonality of the transform matrix, the transform matrices are quantized more accurately than the transform matrices in HEVC. To keep the intermediate values of the transformed coefficients within the 16-bit range, after horizontal and after vertical transform, all the coefficients are kept in 10-bit.

In order to control the MTS scheme, separate enabling flags are specified at the SPS level for intra and inter mode, respectively. When MTS is enabled at SPS, a CU level index is signaled to indicate the transform mode indicating the transform types for the horizontal and vertical directions for the current CU. Here, MTS is applied only for luma. The MTS CU level index (i.e., mts_idx) can be signaled when both width and height are smaller than or equal to 32 and CBF flag is equal to one.

If MTS CU index is equal to zero, then DCT2 is applied in both directions. However, if MTS CU index is larger than zero, the transform types for the horizontal and vertical directions are specified in Table 2.

TABLE 2

Transform and signaling mapping table

| | Intra/inter | |
| mts_idx | Horizontal | Vertical |
|---|---|---|
| 0 | DCT2 | |
| 1 | DST7 | DST7 |
| 2 | DCT8 | DST7 |
| 3 | DST7 | DCT8 |
| 4 | DCT8 | DCT8 |

Low-Frequency Non-Separable Transform (LFNST)

To reduce the complexity of large size DST-7 and DCT-8, high frequency transform coefficients are zeroed out for the DST-7 and DCT-8 blocks with size (width or height, or both width and height) equal to 32. Only the coefficients within the 16×16 lower-frequency region are retained.

In VVC, forward LFNST (low-frequency non-separable transform) 120, which is known as reduced secondary transform, is applied between forward primary transform 110 and quantization 130 (at encoder) and inverse LFNST 150 is applied between de-quantization 140 and inverse primary transform 160 (at decoder side) as shown in FIG. 1. In LFNST, a 4×4 non-separable transform or 8×8 non-separable transform is applied according to the block size. For example, 4×4 LFNST is applied for small blocks (i.e., min (width, height)<8) and 8×8 LFNST is applied for larger blocks (i.e., min (width, height)>4). In FIG. 1, the dot filled area 122 corresponds to 16 input coefficients for 4×4 forward LFNST or 48 input coefficients for 8×8 forward LFNST. The dot filled area 152 corresponds to 8 or 16 input coefficients for 4×4 inverse LFNST or 8 or 16 input coefficients for 8×8 inverse LFNST. The input to the forward primary transform is prediction residuals and the output from the inverse primary transform is the reconstructed residual in this case.

Application of a non-separable transform, which is being used in LFNST, is described in the following example. To apply 4×4 LFNST, the 4×4 input block X, $$X = \begin{bmatrix} X_{00} & X_{01} & X_{02} & X_{03} \\ X_{10} & X_{11} & X_{12} & X_{13} \\ X_{20} & X_{21} & X_{22} & X_{23} \\ X_{30} & X_{31} & X_{32} & X_{33} \end{bmatrix}$$

is first represented as a vector $\vec{X}$:

$$\vec{X} = [X_{00}\ X_{01}\ X_{02}\ X_{03}\ X_{10}\ X_{11}\ X_{12}\ X_{13}\ X_{20}\ X_{21}\ X_{22}\ X_{23}\ X_{30}\ X_{31}\ X_{32}\ X_{33}]^T$$

The non-separable transform is calculated as $\vec{F} = T \cdot \vec{X}$, where $\vec{F}$ indicates the transform coefficient vector, and T is a 16×16 transform matrix. The 16×1 coefficient vector $\vec{F}$ is subsequently re-organized as a 4×4 block using the scanning order for that block (i.e., horizontal, vertical or diagonal). The coefficients with smaller indexes will be placed with the smaller scanning indexes in the 4×4 coefficient block.

Reduced Non-Separable Transform

LFNST (low-frequency non-separable transform) is based on direct matrix multiplication approach to apply non-separable transform so that it is implemented in a single pass without multiple iterations. However, the non-separable transform matrix dimension needs to be reduced to minimize computational complexity and memory space to store the transform coefficients. Hence, a reduced non-separable transform (or RST) method is used in LFNST. The main idea of the reduced non-separable transform is to map an N dimensional vector to an R dimensional vector in a different space, where N/R (R<N) is the reduction factor and N is normally equal to 64 for 8×8 NS ST (Non-Separable Secondary Transforms). Hence, instead of N×N matrix, RST matrix becomes an R×N matrix as follows:

$$T_{R \times N} = \begin{bmatrix} t_{11} & t_{12} & t_{13} & \cdots & t_{1N} \\ t_{21} & t_{22} & t_{23} & & t_{2N} \\ \vdots & & & \ddots & \vdots \\ t_{R1} & t_{R2} & t_{R3} & \cdots & t_{RN} \end{bmatrix}$$

where the R rows of the transform are R bases of the N dimensional space. The inverse transform matrix for RT is the transpose of its forward transform. For 8×8 LFNST, a reduction factor of 4 is applied. In this case, a 64×64 direct matrix, which is normally used for an 8×8 non-separable transform matrix, is reduced to 16×48 direct matrix. Hence, the 48×16 inverse RST matrix is used at the decoder side to generate core (primary) transform coefficients in the 8×8 top-left region. When 16×48 matrices are applied instead of 16×64 with the same transform set configuration, each of which takes 48 input data from three 4×4 blocks in a top-left 8×8 block excluding the right-bottom 4×4 block.

With the help of the reduced dimension, memory usage for storing all LFNST matrices is reduced from 10 KB to 8 KB with reasonable performance drop. In order to reduce complexity, LFNST is restricted to be applicable only if all coefficients outside the first coefficient sub-group are non-significant. Hence, all primary-only transform coefficients have to be zero when LFNST is applied. This allows a conditioning of the LFNST index signaling on the last-significant position. Hence, it avoids the extra coefficient scanning in the current LFNST design, which is needed for checking for significant coefficients only at specific positions. The worst-case handling of LFNST, in terms of multiplications per pixel, restricts the non-separable transforms for 4×4 and 8×8 blocks to 8×16 and 8×48 transforms, respectively. In those cases, the last-significant scan position has to be less than 8 when LFNST is applied for other sizes less than 16. For blocks with a shape of 4×N, N×4 and N>=8, the proposed restriction implies that the LFNST is applied only once and applied to the top-left 4×4 region only. Since all primary-only coefficients are zero when LFNST is applied, the number of operations needed for the primary transforms is reduced in such cases. From encoder perspective, the quantization of coefficients is remarkably simplified when LFNST transforms are tested. A rate-distortion optimized quantization has to be done at most for the first 8 or 16 coefficients in the scan order, and the remaining coefficients are forced to be zero.

LFNST Transform Selection

There are a total of 4 transform sets and 2 non-separable transform matrices (kernels) per transform set in LFNST. The mapping from the intra prediction mode to the transform set is pre-defined as shown in the following Table 3. If one of three CCLM (Cross-Component Linear Model) modes (i.e., INTRA_LT_CCLM, INTRA_T_CCLM or INTRA_L_CCLM as indicated by 81<=predModeIntra<=83) is used for the current block, transform set 0 or the intra prediction mode for luma is selected for the current chroma block. For each transform set, the selected non-separable secondary transform candidate (or named as non-separable transform matric) is further specified by the explicitly signaled LFNST index. The transform set index is signaled in a bit-stream once per Intra CU after transform coefficients.

TABLE 3

Transform selection table

| IntraPredMode | Transform set index |
|---|---|
| IntraPredMode < 0 | 1 |
| 0 <= IntraPredMode <= 1 | 0 |
| 2 <= IntraPredMode <= 12 | 1 |
| 13 <= IntraPredMode <= 23 | 2 |
| 24 <= IntraPredMode <= 44 | 3 |
| 45 <= IntraPredMode <= 55 | 2 |
| 56 <= IntraPredMode <= 80 | 1 |
| 81 <= IntraPredMode <= 83 | 0 |

LFNST Index Signaling and Interaction with Other Tools

Since LFNST is restricted to be applicable only if all coefficients outside the first coefficient sub-group are non-significant, LFNST index (CU-level) coding depends on the position of the last significant coefficient. In addition, the LFNST index is context coded. However, the LFNST index does not depend on intra prediction mode and at least one bin is context coded. Furthermore, LFNST is applied for intra CU in both intra and inter slices for luma and/or chroma. If a dual tree is enabled, LFNST indices for luma and chroma are signaled separately. For inter slice (i.e., the dual tree being disabled), a single LFNST index is signaled and used for luma and/or chroma.

Considering that a large CU greater than 64×64 is implicitly split (TU tiling) due to the existing maximum transform size restriction (i.e., 64×64 or set with configuration), an LFNST index search could increase data buffering by four times for a certain number of decode pipeline stages. Therefore, the maximum size that LFNST is allowed is restricted to 64×64 or maximum transform size. Note that MTS is enabled only with LFNST off.

As proposed in JVET-P0058 (T. Tsukuba, et al., "CE8-2.1: Transform Skip for Chroma with limiting maximum number of context-coded bin in TS residual coding," ITU-T SG 16 WP 3 and ISO/IEC JTC 1/SC 29/WG 11, 16th Meeting: Geneva, CH, 1-11 Oct. 2019, Document: JVET-P0058), it introduces transform skip (TS) for chroma and applies TS residual coding to transform-skipped chroma block. For example, TS is enabled for chroma in all chroma sampling formats. In addition, since BDPCM (block-based delta pulse code modulation) uses TS, BDPCM can be enabled only when TS enabling condition is satisfied. The TS enabling condition contains size constraint which means when the block width is smaller than or equal to the max transform skip size (MaxTsSize) and the block height is smaller than or equal to MaxTsSize. If the condition is satisfied, TS can be enabled. MaxTsSize is a fixed integer or a variable equal to 1<<(log 2 transform skip max size minus2+2), where log 2 transform skip max size minus2 specifies the maximum block size used for transform skip. log 2 transform skip max size minus2 shall be in the range of 0 to 3 and is inferred to be equal to 0 when not present.

In VVC, the size constraint on TS for luma is that if tbWidth<=MaxTsSize && tbHeight<=MaxTsSize, TS can be enabled.

In VVC, the size constraint on TS for chroma is that if wC<=MaxTsSize && hC<=MaxTsSize, TS can be enabled.

In the restrictions mentioned above, wC=tbWidth/SubWidthC and hC=tbHeight/SubHeightC. tbWidth is the block width for luma and tbHeight is the block height for luma. The variables SubWidthC and SubHeightC are specified in the following Table 4 depending on the chroma format sampling structure, which is specified through chroma_format_idc and separate_colour_plane_flag. Other values of chroma_format_idc, SubWidthC and SubHeightC may be specified in the future.

TABLE 4

Variables SubWidthC and SubHeightC specification

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

The detailed signaling condition for transform skip mode for each component is shown in the following Table 5.

TABLE 5

Signaling condition for transform skip mode for each component

Descriptor

```
transform_unit( x0, y0, tbWidth, tbHeight, treeType, subTuIndex, chType ) {
        if( IntraSubPartitionsSplitType != ISP_NO_SPLIT &&
treeType = = SINGLE_TREE && subTuIndex = =
NumIntraSubPartitions − 1 ) {
        xC = CbPosX[ chType ][ x0 ][ y0 ]
        yC = CbPosY[ chType ][ x0 ][ y0 ]
        wC = CbWidth[ chType ][ x0 ][ y0 ] / SubWidthC
        hC = CbHeight[ chType ][ x0 ][ y0 ] / SubHeightC
    } else {
        xC = x0
        yC = y0
        wC = tbWidth / SubWidthC
        hC = tbHeight / SubHeightC
    }
        chromaAvailable = treeType != DUAL_TREE_LUMA &&
ChromaArrayType != 0 &&
( IntraSubPartitionsSplitType = = ISP_NO_SPLIT | |
    ( IntraSubPartitionsSplitType != ISP_NO_SPLIT &&
    subTuIndex = = NumIntraSubPartitions − 1 ) )
        if( ( treeType = = SINGLE_TREE | | treeType = =
DUAL_TREE_CHROMA ) &&
ChromaArrayType != 0 ) {
        if( ( IntraSubPartitionsSplitType = = ISP_NO_SPLIT && !( cu_sbt_flag
&&
```

TABLE 5-continued

Signaling condition for transform skip mode for each component

| | Descriptor |
|---|---|
| ( ( subTuIndex = = 0 && cu_sbt_pos_flag ) \|\| | |
| ( subTuIndex = = 1 && !cu_sbt_pos_flag ) ) ) ) \|\| | |
| ( IntraSubPartitionsSplitType != ISP_NO_SPLIT && | |
| ( subTuIndex = = NumIntraSubPartitions − 1 ) ) ) { | |
| tu_cbf_cb[ xC ][ yC ] | ae(v) |
| tu_cbf_cr[ xC ][ yC ] | ae(v) |
| } | |
| } | |
| if( treeType = = SINGLE_TREE \|\| treeType = = DUAL_TREE_LUMA | |
| ) { | |
| if( ( IntraSubPartitionsSplitType = = ISP_NO_SPLIT && !( cu_sbt_flag | |
| && | |
| ( ( subTuIndex = = 0 && cu_sbt_pos_flag ) \|\| | |
| ( subTuIndex = = 1 && !cu_sbt_pos_flag ) ) ) && | |
| ( CuPredMode[ chType ][ x0 ][ y0 ] = = MODE_INTRA \|\| | |
| ( chromaAvailable && ( tu_cbf_cb[ xC ][ yC ] \|\| | |
| tu_cbf_cr[ xC ][ yC ] ) ) | |
| CbWidth[ chType ][ x0 ][ y0 ] > MaxTbSizeY \|\| | |
| CbHeight[ chType ][ x0 ][ y0 ] > MaxTbSizeY ) ) \|\| | |
| ( IntraSubPartitionsSplitType != ISP_NO_SPLIT && | |
| ( subTuIndex < NumIntraSubPartitions − 1 \|\| !InferTuCbfLuma ) ) ) | |
| tu_cbf_luma[ x0 ][ y0 ] | ae(v) |
| if(IntraSubPartitionsSplitType != ISP_NO_SPLIT ) | |
| InferTuCbfLuma = InferTuCbfLuma && !tu_cbf_luma[ x0 ][ y0 ] | |
| } | |
| if( ( CbWidth[ chType ][ x0 ][ y0 ] > 64 \|\| | |
| CbHeight[ chType ][ x0 ][ y0 ] > 64 \|\| | |
| tu_cbf_luma[ x0 ][ y0 ] \|\| ( chromaAvailable && ( tu_cbf_cb[ xC ][ yC ] | |
| \|\| | |
| tu_cbf_cr[ xC ][ yC ] ) ) && treeType != DUAL_TREE_CHROMA ) { | |
| if( cu_qp_delta_enabled_flag && !IsCuQpDeltaCoded ) { | |
| cu_qp_delta_abs | ae(v) |
| if( cu_qp_delta_abs ) | |
| cu_qp_delta_sign_flag | ae(v) |
| } | |
| } | |
| if( ( CbWidth[ chType ][ x0 ][ y0 ] > 64 \|\| | |
| CbHeight[ chType ][ x0 ][ y0 ] > 64 \|\| | |
| ( chromaAvailable && ( tu_cbf_cb[ xC ][ yC ] \|\| | |
| tu_cbf_cr[ xC ][ yC ] ) ) ) && | |
| treeType != DUAL_TREE_LUMA ) { | |
| if( cu_chroma_qp_offset_enabled_flag && | |
| !IsCuChromaQpOffsetCoded) { | |
| cu_chroma_qp_offset_flag | ae(v) |
| if( cu_chroma_qp_offset_flag && chroma_qp_offset_list_len_minus1 > | |
| 0 ) | |
| cu_chroma_qp_offset_idx | ae(v) |
| } | |
| } | |
| if( sps_joint_cbcr_enabled_flag && ( ( | |
| CuPredMode[ chType ][ x0 ][ y0 ] = = MODE_INTRA && ( | |
| tu_cbf_cb[ xC ][ yC ] \|\| tu_cbf_cr[ xC ][ yC ] ) ) \|\| | |
| ( tu_cbf_cb[ xC ][ yC ] && tu_cbf_cr[ xC ][ yC ] ) ) && chromaAvailable ) | |
| tu_joint_cbcr_residual_flag[ xC ][ yC ] | ae(v) |
| if( tu_cbf_luma[ x0 ][ y0 ] && | |
| treeType != DUAL_TREE_CHROMA ) { | |
| if( sps_transform_skip_enabled_flag && !BdpcmFlag[ x0 ][ y0 ][ 0 ] | |
| && | |
| tbWidth <= MaxTsSize && tbHeight <= MaxTsSize && | |
| ( IntraSubPartitionsSplit[ x0 ][ y0 ] = = ISP_NO_SPLIT ) && !cu_sbt_flag | |
| ) | |
| transform_skip_flag[ x0 ][ y0 ][ 0 ] | ae(v) |
| if( !transform_skip_flag[ x0 ][ y0 ][ 0 ] ) | |
| residual_coding( x0, y0, Log2( tbWidth ), Log2( tbHeight ), 0 ) | |
| else | |
| residual_ts_coding( x0, y0, Log2( tbWidth ), Log2( tbHeight ), 0 ) | |
| } | |
| if( tu_cbf_cb[ xC ][ yC ] && treeType != DUAL_TREE_LUMA ) { | |
| if( sps_transform_skip_enabled_flag && !BdpcmFlag[ x0 ][ y0 ][ 1 ] | |
| && | |
| wC <= MaxTsSize && hC <= MaxTsSize && !cu_sbt_flag ) | |
| transform_skip_flag[ xC ][ yC ][ 1 ] | ae(v) |
| if( !transform_skip_flag[ xC ][ yC ][ 1 ] ) | |
| residual_coding( xC, yC, Log2( wC ), Log2( hC ), 1 ) | |
| else | |
| residual_ts_coding( xC, yC, Log2( wC ), Log2( hC ), 1 ) | |

TABLE 5-continued

Signaling condition for transform skip mode for each component

| | Descriptor |
|---|---|
| `}`<br>`    if( tu_cbf_cr[ xC ][ yC ] && treeType != DUAL_TREE_LUMA &&`<br>`!( tu_cbf_cb[ xC ][ yC ] && tu_joint_cbcr_residual_flag[ xC ][ yC ] ) ) {`<br>`        if( sps_transform_skip_enabled_flag && !BdpcmFlag[ x0 ][ y0 ][ 2 ]`<br>`&&`<br>`wC <= MaxTsSize && hC <= MaxTsSize && !cu_sbt_flag )`<br>`            transform_skip_flag[ xC ][ yC ][ 2 ]`<br>`        if( !transform_skip_flag[ xC ][ yC ][ 2 ] )`<br>`            residual_coding( xC, yC, Log2( wC ), Log2( hC ), 2 )`<br>`        else`<br>`            residual_ts_coding( xC, yC, Log2( wC ), Log2( hC ), 2 )`<br>`    }`<br>`}` | <br><br><br><br><br><br>ae(v) |

In the above syntax table, transform_skip_flag[x0][y0][cIdx] specifies whether a transform is applied to the associated transform block or not. The array indices x0, y0 specify the location (x0, y0) of the top-left luma sample of the considered transform block relative to the top-left luma sample of the picture. The array index cIdx specifies an indicator for the color component; it is equal to 0 for Y, 1 for Cb, and 2 for Cr. transform skip flag[x0][y0][cIdx] equal to 1 specifies that no transform is applied to the associated transform block. transform skip flag[x0][y0][cIdx] equal to 0 specifies that the decision whether transform is applied to the associated transform block or not depends on other syntax elements.

When transform skip flag[x0][y0][cIdx] is not present, it is inferred as follows:
  If BdpcmFlag[x0][y0][cIdx] is equal to 1, transform skip flag[x0][y0][cIdx] is inferred to be equal to 1.
  Otherwise (BdpcmFlag[x0][y0][cIdx] is equal to 0), transform skip flag[x0][y0][cIdx] is inferred to be equal to 0.

In the above, BdpcmFlag[x0][y0][cIdx] is a variable corresponding to an intra BDPCM flag for the luma component (i.e., cIdx=0) or for the chroma component (i.e., cIdx=1 or 2).

BRIEF SUMMARY OF THE INVENTION

A method and apparatus for video coding using Low-Frequency Non-Separable Transform (LFNST) mode and Transform Skip (TS) mode are disclosed. According to the present invention, input data related to a current coding unit (CU) in a current picture are received, where the CU is partitioned into one or more transform blocks (TBs) and the input data correspond to residual data at a video encoder side and the input data correspond to a coded data of the current CU at a video decoder side. A syntax is determined at an encoder side or at a decoder side, where said determining the syntax is performed by signaling the syntax at the encoder side or by parsing the syntax at the decoder side if one or more conditions are satisfied. The syntax (e.g. LFNST index) indicates whether the LFNST mode is applied to the current CU and/or which LFNST kernel is applied if the LFNST mode is applied, and the conditions comprise a target condition corresponding to that all target TBs in a target TB set have a TS mode indication as false, and the target TB set is selected from the TBs in the current CU. The current CU is encoded at the encoder side or decoded at the decoder side according to the LFNST mode as indicated by the syntax. In one embodiment, the syntax refers to the LFNST index.

In one embodiment, in a luma splitting tree, the current CU corresponds to a luma coding block (CB), and the target TB set corresponds to one or more luma TBs.

In one embodiment, in a chroma splitting tree, the current CU corresponds to one or more chroma coding blocks, and the target TB set corresponds to one or more chroma TBs.

In one embodiment, in a single splitting tree, the current CU corresponds to one luma coding block and one or more chroma coding blocks, and the target TB set corresponds to one or more luma TBs and one or more chroma TBs.

In one embodiment, the target TB set comprises the first transform TB(s) for each coding block (CB) in the current CU. For example, in a luma splitting tree, the target TB set comprises the first luma TB for the luma CB in the current CU. For another example, in a chroma splitting tree, the target TB set comprises the first Cb TB for the Cb CB in the current CU and the first Cr TB for the Cr CB in the current CU. For another example, in a single splitting tree, the target TB set comprises the first luma TB for the luma CB in the current CU, the first Cb TB for the Cb CB in the current CU, and the first Cr TB for the Cr CB in the current CU.

In one embodiment, a variable is used to record whether to signal or parse the syntax for the LFNST mode. In another embodiment, the syntax is inferred as the LFNST mode not applied to the current CU when the TS mode indication is true.

In one embodiment, the LFNST mode is not used for a TB in the current CU if an LFNST index for the current CU is equal to zero, and wherein the LFNST index with a value greater than zero indicates one of low-frequency transform matrices selected.

DETAILED DESCRIPTION OF THE INVENTION

Figure 1:
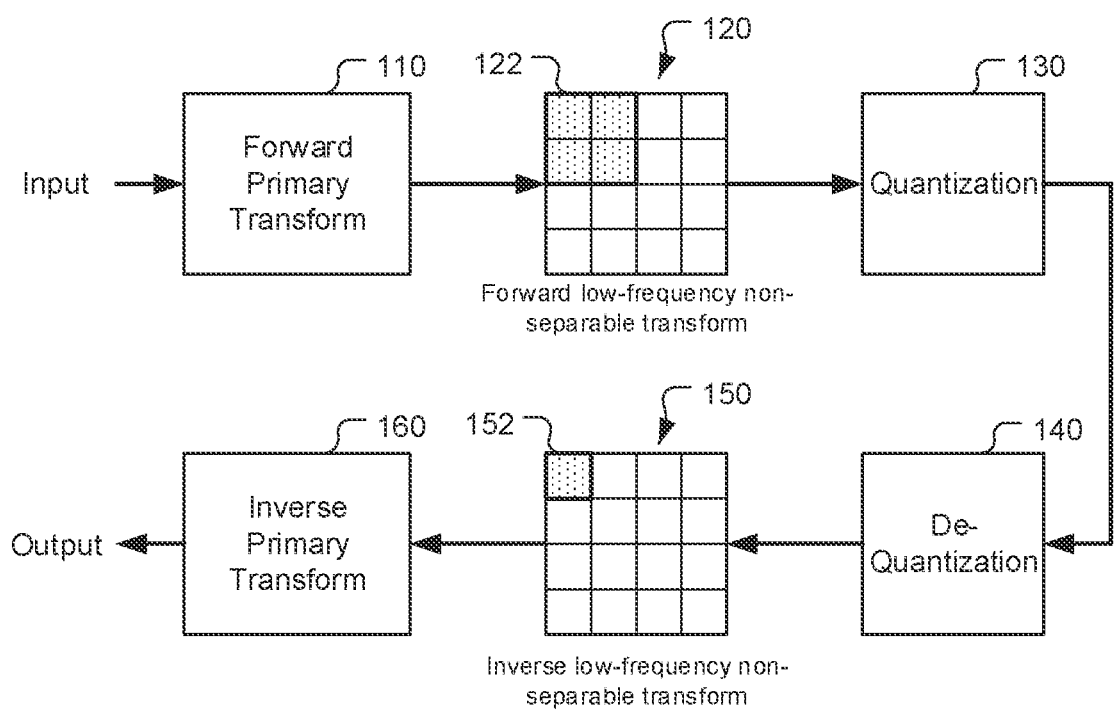
FIG. 1 illustrates an example of video coding incorporating LFNST (Low-Frequency Non-Separable Transform).

The following description is of the best-contemplated mode of carrying out the invention. This description is made for the purpose of illustrating the general principles of the invention and should not be taken in a limiting sense. The scope of the invention is best determined by reference to the appended claims.

The combinations of LFNST with transform skip should not be allowed since when transform skip is applied, no transform process (primary/core transform and/or secondary transform) shall be used. In VVC Draft 7 (B. Bross, et al., "Versatile Video Coding (Draft 7)", Joint Video Experts Team (JVET) of ITU-T SG 16 WP 3 and ISO/IEC JTC 1/SC 29/WG 11, 16th Meeting: Geneva, CH, 1-11 Oct. 2019, Document: JVET-P2001), the syntax for transform skip mode is signaled/parsed at TB level. On the other hand, the syntax for LFNST is signaled/parsed at CU level after all TUs/TBs within that CUs/CBs are signaled/parsed. Therefore, in the current VVC draft text (as shown in Table 6A), the signaling/parsing conditions for LFNST take into consideration of the transform skip flag for luma as follows. As shown in the following syntax table, the existing conditions include the check for luma transform skip (i.e., transform skip flag[x0][y0][0]==0) to prevent such combination. For this check, the VVC test model version 7 (VTM7, J. Chen, et al., "Algorithm description for Versatile Video Coding and Test Model 7 (VTM 7)", Joint Video Experts Team (JVET) of ITU-T SG 16 WP 3 and ISO/IEC JTC 1/SC 29/WG 11, 16th Meeting: Geneva, CH, 1-11 Oct. 2019, Document: JVET-P2002) codes appear to match the VVC Draft 7. Syntax table for residual coding according to JVET-P2001 is shown in Table 6B.

TABLE 6A

Conditions signaling/parsing for LFNST in VVC Draft 7

| | Descriptor |
|---|---|
| coding_unit( x0, y0, cbWidth, cbHeight, cqtDepth, treeType, modeType ) { | |
|   chType = treeType = = DUAL_TREE_CHROMA ? 1 : 0 | |
|   ... | |
|   if( CuPredMode[ chType ][ x0 ][ y0 ] = = MODE_INTRA | | CuPredMode[ chType ][ x0 ][ y0 ] = = MODE_PLT ) { | |
|     if( treeType = = SINGLE_TREE | | treeType = = DUAL_TREE_LUMA ) { | |
|       if( pred_mode_plt_flag ) { | |
|       palette_coding( x0, y0, cbWidth, cbHeight, treeType ) | |
|     } else { | |
|     if( sps_bdpcm_enabled_flag && cbWidth <= MaxTsSize && cbHeight <= MaxTsSize ) | |
|       intra_bdpcm_luma_flag | ae(v) |
|     if( intra_bdpcm_luma_flag ) | |
|       intra_bdpcm_luma_dir_flag | ae(v) |
|     else { | |
|       ... | |
|     } | |
|     } | |
|   } | |
|   if( ( treeType = = SINGLE_TREE | | treeType = = DUAL_TREE_CHROMA ) && ChromaArrayType != 0 ) { | |
|     if( pred_mode_plt_flag && treeType = = DUAL_TREE_CHROMA ) | |
|     palette_coding( x0, y0, cbWidth / SubWidthC, cbHeight / SubHeightC, treeType ) | |
|     else { | |
|     if( !cu_act_enabled_flag ) { | |
|     if( cbWidth <= MaxTsSize && cbHeight <= MaxTsSize && sps_bdpcm_chroma_enabled_flag ) { | |
|       intra_bdpcm_chroma_flag | ae(v) |
|     if( intra_bdpcm_chroma_flag ) | |
|       intra_bdpcm_chroma_dir_flag | ae(v) |
|     } else { | |
|     if( CclmEnabled ) | |
|       cclm_mode_flag | ae(v) |
|     if( cclm_mode_flag ) | |
|       cclm_mode_idx | ae(v) |
|     else | |
|       intra_chroma_pred_mode | ae(v) |
|     } | |
|     } | |
|     } | |
|     } | |
|   } | |
|   } else if( treeType != DUAL_TREE_CHROMA ) { /* MODE_INTER or MODE_IBC */ | |
|   ... | |
|   } | |
|   if( CuPredMode[ chType ][ x0 ][ y0 ] != MODE_INTRA && !pred_mode_plt_flag && general_merge_flag[ x0 ][ y0 ] = = 0 ) | |
|     cu_cbf | ae(v) |
|   if( cu_cbf ) { | |
|     ... | |
|   LfnstDcOnly = 1 | |
|   LfnstZeroOutSigCoeffFlag = 1 | |
|   MtsZeroOutSigCoeffFlag = 1 | |
|   transform_tree( x0, y0, cbWidth, cbHeight, treeType, chType ) | |
|   lfnstWidth = ( treeType = = DUAL_TREE_CHROMA ) ? cbWidth / SubWidthC | |

TABLE 6A-continued

Conditions signaling/parsing for LFNST in VVC Draft 7

| | Descriptor |
|---|---|
| : ( ( IntraSubPartitionsSplitType = = ISP_VER_SPLIT ) ? cbWidth / NumIntraSubPartitions : cbWidth ) <br> lfnstHeight = ( treeType = = DUAL_TREE_CHROMA ) ? cbHeight / SubHeightC <br> : ( ( IntraSubPartitionsSplitType = = ISP_HOR_SPLIT) ? cbHeight / NumIntraSubPartitions : cbHeight ) <br>   if( Min( lfnstWidth, lfnstHeight ) >= 4 && sps_lfnst_enabled_flag = = 1 && <br> CuPredMode[ chType ][ x0 ][ y0 ] = = MODE_INTRA && <br> transform_skip_flag[ x0 ][ y0 ][ 0 ] = = 0 && <br> ( treeType != DUAL_TREE_CHROMA | | !intra_mip_flag[ x0 ][ y0 ] | | <br>   Min( lfnstWidth, lfnstHeight ) >= 16 ) && <br> Max( cbWidth, cbHeight) <= MaxTbSizeY ) { <br>   if( ( IntraSubPartitionsSplitType != ISP_NO_SPLIT | | LfnstDcOnly = = 0 ) && <br> LfnstZeroOutSigCoeffFlag = = 1 ) <br>     lfnst_idx <br>   } <br>   if( treeType != DUAL_TREE_CHROMA && lfnst_idx = = 0 && <br> transform_skip_flag[ x0 ][ y0 ][ 0 ] = = 0 && Max( cbWidth, cbHeight ) <= 32 && <br> IntraSubPartitionsSplit[ x0 ][ y0 ] = = ISP_NO_SPLIT && cu_sbt_flag = = 0 && <br> MtsZeroOutSigCoeffFlag = = 1 && tu_cbf_luma[ x0 ][ y0 ] ) { <br>   if( ( ( CuPredMode[ chType ][ x0 ][ y0 ] = = MODE_INTER && <br> sps_explicit_mts_inter_enabled_flag ) | | <br> ( CuPredMode[ chType ][ x0 ][ y0 ] = = MODE_INTRA && <br> sps_explicit_mts_intra_enabled_flag ) ) ) <br>     mts_idx <br>   } <br> } | <br><br><br><br><br><br><br><br><br><br><br><br><br><br><br>ae(v)<br><br><br><br><br><br><br><br>ae(v) |

TABLE 6B

Syntax table for residual coding in VVC Draft 7

| | Descriptor |
|---|---|
| residual_coding( x0, y0, log2TbWidth, log2TbHeight, cIdx ) { <br>   if( sps_mts_enabled_flag && cu_sbt_flag && cIdx = = 0 && <br> log2TbWidth = = 5 && log2TbHeight < 6 ) <br>     log2ZoTbWidth = 4 <br>   else <br>     log2ZoTbWidth = Min( log2TbWidth, 5 ) <br>   if( sps_mts_enabled_flag && cu_sbt_flag && cIdx = = 0 && <br> log2TbWidth < 6 && log2TbHeight = = 5 ) <br>     log2ZoTbHeight = 4 <br>   else <br>     log2ZoTbHeight = Min( log2TbHeight, 5 ) <br>   if( log2TbWidth > 0 ) <br>     last_sig_coeff_x_prefix <br>   if( log2TbHeight > 0 ) <br>     last_sig_coeff_y_prefix <br>   if( last_sig_coeff_x_prefix > 3 ) <br>     last_sig_coeff_x_suffix <br>   if( last_sig_coeff_y_prefix > 3 ) <br>     last_sig_coeff_y_suffix <br>   log2TbWidth = log2ZoTbWidth <br>   log2TbHeight = log2ZoTbHeight <br>   remBinsPass1 = ( ( 1 << ( log2TbWidth + log2TbHeight ) ) * 7 ) >> 2 <br>   log2SbW = ( Min( log2TbWidth, log2TbHeight ) < 2 ? 1 : 2 ) <br>   log2SbH = log2SbW <br>   if( log2TbWidth + log2TbHeight > 3 ) { <br>     if( log2TbWidth < 2 ) { <br>       log2SbW = log2TbWidth <br>       log2SbH = 4 − log2SbW <br>     } else if( log2TbHeight < 2 ) { <br>       log2SbH = log2TbHeight <br>       log2SbW = 4 − log2SbH <br>     } <br>   } <br>   numSbCoeff = 1 << ( log2SbW + log2SbH ) <br>   lastScanPos = numSbCoeff | <br><br><br><br><br><br><br><br><br><br><br><br>ae(v)<br><br>ae(v)<br><br>ae(v)<br><br>ae(v) |

TABLE 6B-continued

Syntax table for residual coding in VVC Draft 7

| | Descriptor |
|---|---|
| lastSubBlock = (<br>1 << ( log2TbWidth + log2TbHeight − ( log2SbW + log2SbH ) ) ) − 1<br>do {<br>  if( lastScanPos = = 0 ) {<br>  lastScanPos = numSbCoeff<br>  lastSubBlock− −<br>  }<br>  lastScanPos− −<br>  xS = DiagScanOrder[ log2TbWidth − log2SbW ][ log2TbHeight − log2SbH ]<br>[ lastSubBlock ][ 0 ]<br>  yS = DiagScanOrder[ log2TbWidth − log2SbW ][ log2TbHeight − log2SbH ]<br>[ lastSubBlock ][ 1 ]<br>  xC = ( xS << log2SbW ) +<br>DiagScanOrder[ log2SbW ][ log2SbH ][ lastScanPos ][ 0 ]<br>  yC = ( yS << log2SbH ) +<br>DiagScanOrder[ log2SbW ][ log2SbH ][ lastScanPos ][ 1 ]<br>  } while( ( xC != LastSignificantCoeffX ) | | ( yC != LastSignificantCoeffY )<br>)<br>  if( lastSubBlock = = 0 && log2TbWidth >= 2 && log2TbHeight >= 2<br>&&<br>!transform_skip_flag[ x0 ][ y0 ][ cIdx ] && lastScanPos > 0 )<br>  LfnstDcOnly = 0<br>  if( ( lastSubBlock > 0 && log2TbWidth >= 2 && log2TbHeight >= 2 ) | |<br>( lastScanPos > 7 && ( log2TbWidth = = 2 | | log2TbWidth = = 3 ) &&<br>log2TbWidth = = log2TbHeight ) )<br>  LfnstZeroOutSigCoeffFlag = 0<br>  if( ( LastSignificantCoeffX > 15 | | LastSignificantCoeffY > 15 ) && cIdx<br>= = 0 )<br>  MtsZeroOutSigCoeffFlag = 0<br>  ...<br>  }<br> }<br>} | |

In the existing condition of LFNST signaling/parsing, two issues are observed. One issue is that when luma and chroma use different splitting trees, it fails to find transform skip flag for luma (i.e., transform_skip_flag [x0][y0][0]) when the current CU is in a chroma splitting tree (i.e., the case with treeType==DUAL_TREE_CHROMA). The other issue is caused by the extension of transform skip to chroma as disclosed in WET-P0058. The check mentioned above should be extended to include Cb and Cr checks. Some methods are proposed to handle the issues.

The proposed check is to take into consideration the condition of transform_skip_flag(s) of M TB(s) in the CU. For a TB with one or more transform coefficient levels not equal to 0, the transform_skip_flag for the TB is used to indicate if the transform operations is applied to the TB and the proposed check is used to prevent the TB from the combinations of LFNST with transform skip.

As mentioned previously, in a corresponding splitting tree which can be a luma splitting tree (DUAL_TREE_LUMA), chroma splitting tree (DUAL_TREE_CHROMA), or a single splitting tree (SINGLE_TREE), there are one or more TBs in the current CU. The M TB(s) corresponds to a set of selected TBs, referred as target TBs. The condition of transform_skip_flag(s) of the target TB set is checked. Passing the check means that the transform_skip_flag(s) for all M TBs is false (i.e., transform skip flag(s) 0); in other words, passing the check means the target condition (which corresponds to that all target TBs in the target TB set have a TS mode indication as false) is satisfied. In other words, the transform skip mode flag(s) condition is satisfied if none of the selected TB(s) uses the transform skip mode. After passing the check (i.e., transform skip mode flag(s) condition being satisfied), the signaling/parsing conditions for LFNST related to transform skip mode are satisfied and the syntax for LFNST can be signaled/parsed if other signaling/parsing conditions for LFNST are also satisfied.

In one embodiment, M TB(s) only include the first component in each luma/chroma splitting tree. An example of the proposed syntax table is shown in Table 7.

TABLE 7

An exemplary syntax table of condition signaling/parsing for
LFNST according to one embodiment of the present invention.

If( Min( lfnstWidth, lfnstHeight ) >= 4 && sps_lfnst_enabled_flag
= = 1 &&
CuPredMode[ chType ][ x0 ][ y0 ] = = MODE_INTRA &&
transform_skip_flag[ x0 ][ y0 ][ chType ] = = 0 &&
( treeType != DUAL_TREE_CHROMA | | !intra_mip_flag[ x0 ][ y0 ] | |
  Min( lfnstWidth, lfnstHeight ) >= 16 ) &&
Max( cbWidth, cbHeight ) <= MaxTbSizeY) {
  if( ( IntraSubPartitionsSplitType != ISP_NO_SPLIT | | LfnstDcOnly
= = 0 ) &&

TABLE 7-continued

An exemplary syntax table of condition signaling/parsing for
LFNST according to one embodiment of the present invention.

```
LfnstZeroOutSigCoeffFlag = = 1 )
  lfnst_idx                                                   ae(v)
}
```

In another embodiment, for a single splitting tree used for both luma and chroma components, M TB(s) include one or more components.

In one sub-embodiment, M TB(s) refers to one selected component. For example, M TB(s) refers to the first component. In another example, M TB(s) refers to Y (i.e., luma component). An exemplary syntax table according to one embodiment is shown in Table 8. In another example, M TB(s) can be any one component in the splitting tree.

TABLE 8

An exemplary syntax table of signaling/parsing for LFNST
according to one embodiment of the present invention.

```
if( Min( lfnstWidth, lfnstHeight ) >= 4 && sps_lfnst_enabled_flag
= = 1 &&
CuPredMode[ chType ][ x0 ][ y0 ] = = MODE_INTRA &&
(treeType = = SINGLE_TREE && transform_skip_flag[ x0 ][ y0 ][ 0 ] = =
0) &&
( treeType != DUAL_TREE_CHROMA | | !intra_mip_flag[ x0 ][ y0 ] | |
  Min( lfnstWidth, lfnstHeight ) >= 16 ) &&
Max( cbWidth, cbHeight ) <= MaxTbSizeY ) {
  if( ( IntraSubPartitionsSplitType != ISP_NO_SPLIT | | LfnstDcOnly
= = 0 ) &&
LfnstZeroOutSigCoeffFlag = = 1 )
  lfnst_idx                                                   ae(v)
}
```

In another embodiment, when the splitting tree is not a chroma tree (i.e., the splitting tree contains Y (i.e., luma) component), M TB(s) refers to Y (i.e., luma) TB(s). An exemplary syntax table according to one embodiment is shown in Table 9.

TABLE 9

An exemplary syntax table of signaling/parsing for LFNST
according to one embodiment of the present invention.

```
if( Min( lfnstWidth, lfnstHeight ) >= 4 && sps_lfnst_enabled_flag = = 1
&&
CuPredMode[ chType ][ x0 ][ y0 ] = = MODE_INTRA &&
(treeType != DUAL_TREE_CHROMA && transform_skip_flag[ x0 ][ y0 ][ 0 ]
= = 0)
&& ( treeType != DUAL_TREE_CHROMA | | !intra_mip_flag[ x0 ][ y0 ] | |
  Min( lfnstWidth, lfnstHeight ) >= 16 ) &&
Max( cbWidth, cbHeight ) <= MaxTbSizeY ) {
  if( ( IntraSubPartitionsSplitType != ISP_NO_SPLIT | | LfnstDcOnly = =
0 ) &&
LfnstZeroOutSigCoeffFlag = = 1 )
  lfnst_idx                                                   ae(v)
}
```

In another embodiment, for a chroma splitting tree, M TB(s) include all chroma components (e.g. Cb and Cr). If any transform_skip_flag for the chroma components is false (i.e., transform_skip_flag equal to 0), the check is passed.

In another embodiment, for a luma splitting tree, M TB(s) include all components (e.g. Y). If any transform_skip_flag for these components is false (i.e., transform_skip_flag equal to 0), the check is passed. An exemplary syntax table according to this embodiment is shown in Table 10.

In another embodiment, for a single tree used for luma and chroma components, M TB(s) include all components (e.g. Y, Cb, and Cr). If any transform_skip_flag for these components is false (i.e., transform_skip_flag equal to 0), the check is passed. An exemplary syntax table according to this embodiment is shown in Table 10.

TABLE 10

An exemplary syntax table of signaling/parsing for LFNST according to one embodiment of the present invention.

```
if( Min( lfnstWidth, lfnstHeight ) >= 4 && sps_lfnst_enabled_flag = =
1 &&
CuPredMode[ chType ][ x0 ][ y0 ] = = MODE_INTRA &&
(treeType == DUAL_TREE_CHROMA? (transform_skip_flag[ x0 ][ y0 ][ 1]
= = 0 || transform_skip_flag[ x0 ][ y0 ][ 2 ] = = 0) : (treeType ==
DUAL_TREE_LUMA ? transform_skip_flag[ x0 ][ y0 ][ 0] = = 0:
(transform_skip_flag[ x0 ][ y0 ][ 0] = = 0 || transform_skip_flag[ x0 ][ y0 ][ 1]
= = 0 || transform_skip_flag[ x0 ][ y0 ][ 2] = = 0))) &&
( treeType != DUAL_TREE_CHROMA | | !intra_mip_flag[ x0 ][ y0 ] | |
  Min( lfnstWidth, lfnstHeight ) >= 16 ) &&
Max( cbWidth, cbHeight ) <= MaxTbSizeY) {
    if( ( IntraSubPartitionsSplitType != ISP_NO_SPLIT | | LfnstDcOnly = =
0 ) &&
LfnstZeroOutSigCoeffFlag = = 1 )
        lfnst_idx                                                    ae(v)
}
```

In another embodiment, for a chroma splitting tree, M TB(s) include all chroma components (e.g. Cb and Cr). If all of the transform skip flags for the chroma components are false (i.e., transform_skip_flag equal to 0), the check is passed.

In another embodiment, for a luma splitting tree, M TB(s) include all luma components (e.g. Y). If all of the transform skip flags for these components are false (i.e., transform_skip_flag equal to 0), the check is passed. An exemplary syntax table according to this embodiment is shown in Table 11.

In another embodiment, for a single tree used for luma and chroma components, M TB(s) include all components (e.g. Y, Cb, and Cr). If all of the transform skip flags for these components are false (i.e., transform_skip_flag equal to 0), the check is passed. An exemplary syntax table according to this embodiment is shown in Table 11.

In yet another embodiment, two or more of the above three embodiments can be combined. For example, the combined embodiment may only check the luma transform_skip_flag when the splitting tree is not a chroma splitting tree (e.g. not for DUAL_TREE_CHROMA) and only check the chroma transform_skip_flag when the splitting tree is not a luma splitting tree (e.g. not for DUAL_TREE_LUMA). An exemplary syntax table according to this embodiment is shown in Table 11.

TABLE 11

An exemplary syntax table of signaling/parsing for LFNST according to one embodiment of the present invention.

```
If( Min( lfnstWidth, lfnstHeight ) >= 4 && sps_lfnst_enabled_flag = = 1
&&
CuPredMode[ chType ][ x0 ][ y0 ] = = MODE_INTRA &&
(treeType == DUAL_TREE_CHROMA? (transform_skip_flag[ x0 ][ y0 ][ 1]
= = 0 && transform_skip_flag[ x0 ][ y0 ][ 2 ] = = 0) : (treeType ==
DUAL_TREE_LUMA ? transform_skip_flag[ x0 ][ y0 ][ 0] = = 0:
(transform_skip_flag[ x0 ][ y0 ][ 0] = = 0 && transform_skip_flag[ x0 ][ y0 ][ 1]
= = 0 && transform_skip_flag[ x0 ][ y0 ][ 2] = = 0))) &&
( treeType != DUAL_TREE_CHROMA | | !intra_mip_flag[ x0 ][ y0 ] | |
  Min( lfnstWidth, lfnstHeight ) >= 16 ) &&
Max( cbWidth, cbHeight ) <= MaxTbSizeY) {
    if( ( IntraSubPartitionsSplitType != ISP_NO_SPLIT | | LfnstDcOnly = =
0 ) &&
LfnstZeroOutSigCoeffFlag = = 1 )
        lfnst_idx                                                    ae(v)
}
```

Another exemplary syntax table for the combination of the above three embodiments is shown in Table 12.

TABLE 12

An exemplary syntax table of signaling/parsing for LFNST according to one embodiment of the present invention.

```
if( Min( lfnstWidth, lfnstHeight ) >= 4 && sps_lfnst_enabled_flag == 1
&&CuPredMode[ chType ][ x0 ][ y0 ] = = MODE_INTRA &&
    (treeType == DUAL_TREE_CHROMA | |
transform_skip_flag[ x0 ][ y0 ][ 0 ] = = 0) &&
    (treeType == DUAL_TREE_LUMA | | (transform_skip_flag[ x0 ][ y0 ][ 1 ]
= = 0 &&
    transform_skip_flag[ x0 ][ y0 ][ 2 ] = = 0)) && ( treeType = =
DUAL_TREE_CHROMA | |
```

TABLE 12-continued

An exemplary syntax table of signaling/parsing for LFNST
according to one embodiment of the present invention.

```
  !intra_mip_flag[ x0 ][ y0 ] | |Min( lfnstWidth, lfnstHeight ) >= 16 ) &&
Max( cbWidth, cbHeight ) <= MaxTbSizeY) {
    if( ( IntraSubPartitionsSplitType != ISP_NO_SPLIT | | LfnstDcOnly = =
0 ) &&
LfnstZeroOutSigCoeffFlag = = 1 )
      lfnst_idx                                                    ae(v)
  }
```

In another embodiment, the check is not passed, the syntax for LFNST (e.g., LFNST index) is not signaled/parsed.

In one sub-embodiment, the syntax for LFNST (LFNST index) is inferred to be 0 (i.e., LFNST not applied).

In another embodiment, one bitstream conformance is required to handle the case if the check is not passed. The bitstream conformance is as follows. It is a requirement of bitstream conformance that the value of lfnst_index shall not be larger than 0 when the check is not passed. In the following, an example of bitstream conformance is illustrated for the case of checking "the transform_skip_flag (s) for M TB(s), where M TB(s) means only the first component in each luma/chroma splitting tree". The requirement of bitstream conformance corresponds to that the value of lfnst_index shall not be larger than 0 when the value of transform_skip_flag for the first component in each of luma/chroma splitting tree (e.g., transform_skip_flag[x0] [y0][chType], where if treeType==DUAL_TREE_CHROMA, chType indicates 1 (i.e., Cb); otherwise, chType indicates 0 (i.e., Y)) is greater than 1.

In another embodiment, a variable can be created in the draft text or software to record whether to signal/parse the syntax for LFNST. The value of this variable is updated according to one or more existing signaling/parsing conditions for LFNST and/or one or more proposed checks in this invention. For example, this variable is initialized with 1 and if any existing signaling/parsing condition for LFNST and/or one or more proposed checks in this invention is not satisfied, this variable is changed to 0 and the syntax for LFNST is not signaled/parsed.

In another embodiment, a unification checking mechanism is used for different splitting trees for luma and chroma. For example, when the luma and chroma use dual trees (i.e., separate splitting trees), the luma CU is in a luma splitting tree and the chroma CU is in a chroma splitting tree. The unification mechanism is that LFNST is disabled if any one of the transform skip flag (s) for all components in the current CU is using transform skip.

Due to the current size constraint to LFNST, LFNST can be applied when one CU/CB contains one TU/TB. The check can take into account of the transform_skip_flag for one TU/TB instead of multiple TUs/TBs. When one CU/CB contains multiple TUs/TBs, the proposed check is according to one or more TUs/TBs in that CU/CB. In one embodiment, the proposed check is according to all TUs/TBs in that CU/CB. In another embodiment, the check is according to any one of the TUs/TBs in that CU/CB (e.g. the first TU/TB or the last TU/TB). For example, in a luma splitting tree, the target TB set comprises the first luma TB for the luma CB in the current CU. For another example, in a chroma splitting tree, the target TB set comprises the first Cb TB for the Cb CB in the current CU and the first Cr TB for the Cr CB in the current CU. For another example, in a single splitting tree, the target TB set comprises the first luma TB for the luma CB in the current CU, the first Cb TB for the Cb CB in the current CU, and the first Cr TB for the Cr CB in the current CU. In another embodiment, the check is according to any subset of the TUs/TBs in that CU/CB.

Overflow in joint Cb/Cr transform (JCCR) first proposed in JVET-N0054 (J. Lainema, "CE7: Joint coding of chrominance residuals (CE7-1)," ITU-T SG 16 WP 3 and ISO/IEC JTC 1/SC 29/WG 11, 14$^{th}$ Meeting: Geneva, CH, 19-27 Mar. 2019, Document: JVET-N0054). In TrQuant.cpp, invTransformCbCr( ), the value cb[x]=−32768 will overflow the 16-bit data type if the Cr=−Cb transformation is applied. Specifically, the code line below:

else if (signedMode==−2){cr[x]=−cb[x];}.

One way to fix it might be to add an extra condition. For example:

else if (signedMode==−2){cr[x]=(cb[x]==−32768)? 32767: −cb[x];}

It is an implementation issue, instead of a normative change. The present implementation will not cause overflow by setting Cr=+32767 rather than +32768 when cb is equal to −32768

Setting the Cr residual to 32767 rather than 32768 would not make a difference after the residual is added to the prediction and clipped to the pixel bit depth. This is the case at least for bit depths up to 14 bits.

Another way to fix this overflow in JCCR is to set CoeffMin as −(1<<15)+1.

The variables CoeffMin and CoeffMax specifying the minimum and maximum transform coefficient values are derived as follows:

CoeffMin=−(1<<15)

CoeffMax=(1<<15)−1

Moreover, the usage of LFNST can be limited under some conditions. In the current design, LFNST is applied for intra CU in both intra and inter slices, and luma and/or chroma. If a dual tree is enabled, LFNST indices for luma and chroma are signaled/parsed separately. For inter slice, where the dual tree is disabled, a single LFNST index is signaled/parsed and used for Luma and/or chroma. In this invention, chroma LFNST is disabled under some cases.

In one embodiment, for a single tree, chroma LFNST is disabled.

In one sub-embodiment, when chroma LFNST is disabled, the LFNST index is still signaled/parsed and can be used for luma.

In another embodiment, chroma LFNST is disabled.

In one sub-embodiment, when chroma LFNST is disabled, the LFNST index is not signaled/parsed in the chroma dual tree.

In another embodiment, LFNST cannot be used for a TB even though the LFNST index for the CU containing the TB is larger than zero. A variable, applyLfnstFlag, is created to indicate whether LFNST can be used or not. If applyLfnstFlag is equal to 0, LFNST cannot be used. If applyLfnstFlag is equal to 1, LFNST can be used.

For example, for a single tree, chroma LFNST is disabled. The variable applyLfnstFlag is derived as follows: (where xTbY and yTbY means the corresponding luma sample location for the TB, cIdx refers to the component for the TB (e.g. cIdx equal to 0 referring to luma component, cIdx equal to 1 referring to Cb component, and cIdx equal to 2 referring to Cr component), lfnst_idx is the LFNST index for the CU, and nTbW and nTbH means the width and height of the TB)

If (1) treeType is equal to SINGLE_TREE, (2) lfnst_idx is not equal to 0, (3) transform_skip_flag[xTbY][yTbY][cIdx] is equal to 0, (4) cIdx is equal to 0 and (5) both nTbW and nTbH are greater than or equal to 4, applyLfnstFlag is set to 1. (Any subset of (1) to (5) can be used in this condition)

Otherwise, if (1) treeType is not equal to SINGLE_TREE, (2) lfnst_idx is not equal to 0, (3) transform_skip_flag[xTbY][yTbY][cIdx] is equal to 0 and (4) both nTbW and nTbH are greater than or equal to 4, applyLfnstFlag is set to 1. (Any subset of (1) to (4) can be used in this condition)

Otherwise, applyLfnstFlag is set to 0.

For another example, chroma LFNST is disabled. The variable applyLfnstFlag is derived as follows:

If (1) lfnst_idx is not equal to 0, (2) transform_skip_flag[xTbY][yTbY][cIdx] is equal to 0, (3) cIdx is equal to 0 and (4) both nTbW and nTbH are greater than or equal to 4, applyLfnstFlag is set to 1. (Any subset of 1 to 4 can be used in this condition)

Otherwise, applyLfnstFlag is set to 0.

In another sub-embodiment, applyLfnstFlag can be used in one or more LFNST-related sections. For example, the LFNST index is referenced in a corresponding section in the draft standard.

8.7.4 Transformation process for scaled transform coefficients

. . . When applyLfnstFlag is equal to 1//lfnst_idx is not equal to 0 and transform_skip_flag[xTbY][yTbY][cIdx] is equal to 0 and both nTbW and nTbH are greater than or equal to 4//, the following applies: . . .

In the above modified texts based on the draft standard, the texts enclosed by a pair of "//" indicate deleted texts.

8.7.3 Scaling Process for Transform Coefficients

. . . For the derivation of the scaled transform coefficients d[x][y] with x=0 . . . nTbW−1, y=0 . . . nTbH−1, the following applies:

The intermediate scaling factor m[x][y] is derived as follows:

If one or more of the following conditions are true, m[x][y] is set equal to 16:

sps_scaling_list_enabled_flag is equal to 0.

pic_scaling_list_present_flag is equal to 0.

transform_skip_flag[xTbY][yTbY][cIdx] is equal to 1.

scaling_matrix_for_lfnst_disabled_flag is equal to 1 and applyLfnstFlag is equal to 1//lfnst_idx[xTbY][yTbY] is not equal to 0// . . . .

In the above modified texts based on the draft standard, the texts enclosed by a pair of "//" indicate deleted texts.

In another embodiment, when chroma LFNST is disabled in some cases, LfnstDcOnly, which is initialized as 1 before parsing each TB in one CU and is changed to 0 if any TB in that CU has any significant coefficients (or the last significant coefficient) located at the position larger than DC position, is not updated in the no-LFNST TBs. For example, chroma LFNST is disabled for a single tree. Then, no-LFNST TBs include chroma TBs for a single tree. An example of the corresponding changes in the syntax table is shown in Table 13.

TABLE 13

An exemplary syntax table of signaling/parsing for LFNST according to one embodiment of the present invention.

| | Descriptor |
|---|---|
| Residual_coding( x0, y0, log2TbWidth, log2TbHeight, cIdx ) {...<br>  if( lastSubBlock = = 0 && log2TbWidth >= 2 && log2TbHeight >= 2 &&<br>!transform_skip_flag[ x0 ][ y0 ][ cIdx ] && lastScanPos > 0 && ( (cIdx == 0) \|\|<br>    (treeType != SINGLE_TREE)) )<br>    LfnstDcOnly = 0<br>    if( ( lastSubBlock > 0 && log2TbWidth >= 2 &&<br>log2TbHeight >= 2 ) \|\|<br>( lastScanPos > 7 && ( log2TbWidth = = 2 \|\| log2TbWidth = = 3 ) &&<br>log2TbWidth = = log2TbHeight ) )<br>    LfnstZeroOutSigCoeffFlag = 0<br>...} | |

In another example, chroma LFNST is disabled and no-LFNST TBs include chroma TBs. An example of the corresponding changes in the syntax table is shown in Table 14.

TABLE 14

An exemplary syntax table of signaling/parsing for LFNST according to one embodiment of the present invention.

| | Descriptor |
|---|---|
| residual_coding( x0, y0, log2TbWidth, log2TbHeight, cIdx ) {...<br>  if( lastSubBlock = = 0 && log2TbWidth >= 2 && | |

TABLE 14-continued

An exemplary syntax table of signaling/parsing for LFNST
according to one embodiment of the present invention.

Descriptor

```
log2TbHeight >= 2 &&
!transform_skip_flag[ x0 ][ y0 ][ cIdx ] && lastScanPos > 0 &&
( cIdx = 0) )
    LfnstDcOnly = 0
    if( ( lastSubBlock > 0 && log2TbWidth >= 2 &&
log2TbHeight >= 2 ) | |
( lastScanPos > 7 && ( log2TbWidth = = 2 | | log2TbWidth = = 3 )
&&
log2TbWidth = = log2TbHeight ) )
    LfnstZeroOutSigCoeffFlag = 0
    ...}
```

In another embodiment, when chroma LFNST is disabled in some cases, LfnstZeroOutSigCoeffFlag, which is initialized as 1 before parsing each TB in one CU and is changed to 0 if any TB in that CU has any significant coefficients (or the last significant coefficient) located at the LFNST zero-out region, is not updated in the no-LFNST TBs. For examplechroma LFNST is disabled for a single tree. Then, no-LFNST TBs include chroma TBs for a single tree. An example of the corresponding changes in the syntax table is shown in Table 15.

TABLE 15

An exemplary syntax table of signaling/parsing for LFNST
according to one embodiment of the present invention.

Descriptor

```
residual_coding( x0, y0, log2TbWidth, log2TbHeight, cIdx ) {...
    if( lastSubBlock = = 0 && log2TbWidth >= 2 && log2TbHeight
>= 2 &&
!transform_skip_flag[ x0 ][ y0 ][ cIdx ] && lastScanPos > 0 )
    LfnstDcOnly = 0
    if( ( lastSubBlock > 0 && log2TbWidth >= 2 && log2TbHeight >=
2 ) | |
( lastScanPos > 7 && ( log2TbWidth = = 2 | | log2TbWidth = = 3 ) &&
log2TbWidth = = log2TbHeight ) && ( (cIdx == 0) || (treeType !=
SINGLE_TREE)))
    LfnstZeroOutSigCoeffFlag = 0
    ...}
```

In another example, chroma LFNST is disabled and no-LFNST TBs include chroma TBs. An example of the corresponding changes in the syntax table is shown in Table 16.

TABLE 16

An exemplary syntax table of signaling/parsing for LFNST
according to one embodiment of the present invention.

Descriptor

```
Residual_coding( x0, y0, log2TbWidth, log2TbHeight, cIdx ) {...
    if( lastSubBlock = = 0 && log2TbWidth >= 2 &&
log2TbHeight >= 2 &&
!transform_skip_flag[ x0 ][ y0 ][ cIdx ] && lastScanPos > 0 )
    LfnstDcOnly = 0
    if( ( lastSubBlock > 0 && log2TbWidth >= 2 &&
log2TbHeight >= 2 ) | |
( lastScanPos > 7 && ( log2TbWidth = = 2 | | log2TbWidth = = 3 )
&&
log2TbWidth = = log2TbHeight ) &&( cIdx = 0 ) )
    LfnstZeroOutSigCoeffFlag = 0
    ...}
```

Based on Table 11, which means only check the luma transform_skip_flag when coding luma TUs (e.g. not for DUAL_TREE_CHROMA) and only check the chroma transform_skip_flag when coding chroma TUs (e.g. not for DUAL_TREE_LUMA), chroma LFNST is disabled under some cases. For example, for a single tree, chroma LFNST is disabled. An example of the proposed syntax table is shown in Table 17.

TABLE 17

An exemplary syntax table of signaling/parsing for LFNST according to one embodiment of the present invention.

if( Min( lfnstWidth, lfnstHeight ) >= 4 && sps_lfnst_enabled_flag = = 1 &&
CuPredMode[ chType ][ x0 ][ y0 ] = = MODE_INTRA &&
(treeType == DUAL_TREE_CHROMA? (transform_skip_flag[ x0 ][ y0 ][ 1 ]
= = 0 &&
 transform_skip_flag[ x0 ][ y0 ][ 2 ] = = 0) :
(transform_skip_flag[ x0 ][ y0 ][ 0] = = 0)) &&
( treeType != DUAL_TREE_CHROMA | | !intra_mip_flag[ x0 ][ y0 ] | |
  Min( lfnstWidth, lfnstHeight ) >= 16 ) &&
Max( cbWidth, cbHeight ) <= MaxTbSizeY) {
  if( ( IntraSubPartitionsSplitType != ISP_NO_SPLIT | | LfnstDcOnly = =
0 ) &&
LfnstZeroOutSigCoeffFlag = = 1 )
    lfnst_idx     ae(v)
}

Another example of the proposed syntax table based on Table 12 is also represented in Table 18.

TABLE 18

An exemplary syntax table of signaling/parsing for LFNST according to one embodiment of the present invention.

if( Min( lfnstWidth, lfnstHeight ) >= 4 && sps_lfnst_enabled_flag == 1
&&CuPredMode[ chType ][ x0 ][ y0 ] = = MODE_INTRA &&
  (treeType == DUAL_TREE_CHROMA | |
transform_skip_flag[ x0 ][ y0 ][ 0 ] = = 0) && (treeType !=
DUAL_TREE_CHROMA | | (transform_skip_flag[ x0 ][ y0 ][ 1 ] = = 0 &&
transform_skip_flag[ x0 ][ y0 ][ 2 ] = = 0)) &&
  ( treeType = = DUAL_TREE_CHROMA | | !intra_mip_flag[ x0 ][ y0 ] | |
Min( lfnstWidth, lfnstHeight ) >= 16 ) &&
Max( cbWidth, cbHeight ) <= MaxTbSizeY) {
  if( ( IntraSubPartitionsSplitType != ISP_NO_SPLIT | | LfnstDcOnly = =
0 ) &&
LfnstZeroOutSigCoeffFlag = = 1 )
    lfnst_idx     ae(v)
}

In another example, chroma LFNST is disabled. The proposed syntax table is shown as follows. An example of the proposed syntax table is shown in Table 19.

TABLE 19

An exemplary syntax table of signaling/parsing for LFNST according to one embodiment of the present invention.

if( Min( lfnstWidth, lfnstHeight ) >= 4 && sps_lfnst_enabled_flag = = 1
&&
CuPredMode[ chType ][ x0 ][ y0 ] = = MODE_INTRA &&
(treeType != DUAL_TREE_CHROMA && (transform_skip_flag[ x0 ][ y0 ][ 0]
= = 0)) &&
( treeType != DUAL_TREE_CHROMA | | !intra_mip_flag[ x0 ][ y0 ] | |
  Min( lfnstWidth, lfnstHeight ) >= 16 ) &&
Max( cbWidth, cbHeight ) <= MaxTbSizeY) {
  if( ( IntraSubPartitionsSplitType != ISP_NO_SPLIT | | LfnstDcOnly = =
0 ) &&
LfnstZeroOutSigCoeffFlag = = 1 )
    lfnst_idx     ae(v)
}

In VVC Draft 7, the LFNST and MTS indexes are coded at the end of the CU, which introduces the latency and buffer issues that a decoder needs to buffer all the coefficients of all three color components before receiving the MTS and LFNST indexes. In order to reduce the latency and buffer issues, it is proposed to send the MTS and/or LFNST enabling flag or index (e.g. 0 for disable, 1 and 2 for enable. 1 and 2 means using different primary transform or different LFNST matrix) at the end of the first TB in a CU or the end of the one or more TBs of the first color component, or at the end of the first non-zero TB (and non-transform skip TB) in a CU or the end of the one or more TBs of the first color component (and non-transform skip TB).

In another embodiment, it is proposed to send the MTS and/or LFNST enabling flag or index at the end of the first non-zero TB (and non-transform skip TB) in a CU or the end of the one or more TBs of the first color component (and non-transform skip TB). In one example, it can be applied to single tree only. In a single tree, the LFNST and MTS indexes are signaled/parsed after the luma TB (or before the chroma TBs). If the single tree and ISP are applied, the LFNST and MTS indexes are signaled/parsed after the last luma TB (or before the chroma TBs). For example, the subTuIndex can be used. When the subTuIndex is equal to NumIntraSubPartitions−1, the current TB is luma TB, and the current tree type is single tree, the MTS and LFNST indexes are signaled/parsed (if one or more conditions are satisfied).

In another embodiment, it is proposed to send the MTS and/or LFNST enabling flag or index at the end of the one or more luma TBs in a CU (or before the chroma TBs) in the single tree case; while in the luma dual tree, the MTS and/or LFNST index is signaled/parsed at the end of the one or more luma TBs in a CU (or at the end of the CU); while in the chroma dual tree, the MTS and/or LFNST index is signaled/parsed after the end of the Cr TBs in a CU (or said at the end of the CU). If the single tree and ISP are applied, the LFNST and MTS indexes are signaled/parsed after the last luma TB (or before the chroma TBs). For example, the subTuIndex can be used. When the subTuIndex is equal to NumIntraSubPartitions−1, the current TB is luma TB and the current tree type is single tree, the MTS and LFNST indexes are signaled/parsed (if one or more conditions are satisfied).

In another embodiment, the MTS and/or LFNST enabling flag or index is signaled/parsed at the first TB (e.g. at the end of the first TB) when ISP mode is used. The proposed method can only be applied to single tree (e.g. still signal/parse the MTS/LFNST index at the end of the CU in luma dual tree or chroma dual tree).

In the above mentioned method, the MTS index can be signaled/parsed after the LFNST index. If the LFNST is used (e.g. LFNST index is not 0), the MTS index is inferred as 0. In another embodiment, the LFNST can be signaled/parsed after the MTS index signaling/parsing. If the MTS is used (e.g. MTS index is not 0), the LFNST index is inferred as 0.

Any above-proposed methods can be combined.

Any variances of above can be implicitly decided with the block width or block height or block area, or explicitly decided by a flag signaled/parsed at CU, CTU, slice, tile, tile group, SPS, PPS, or picture level. "Block" in this invention can means TU/TB/CU/CB/PU/PB.

Any of the foregoing proposed methods can be implemented in encoders and/or decoders. For example, any of the proposed methods can be implemented in an inter/intra/transform coding module of an encoder, a motion compensation module, a merge candidate derivation module of a decoder. Alternatively, any of the proposed methods can be implemented as a circuit coupled to the inter/intra/transform coding module of an encoder and/or motion compensation module, a merge candidate derivation module of the decoder.

Figure 2:
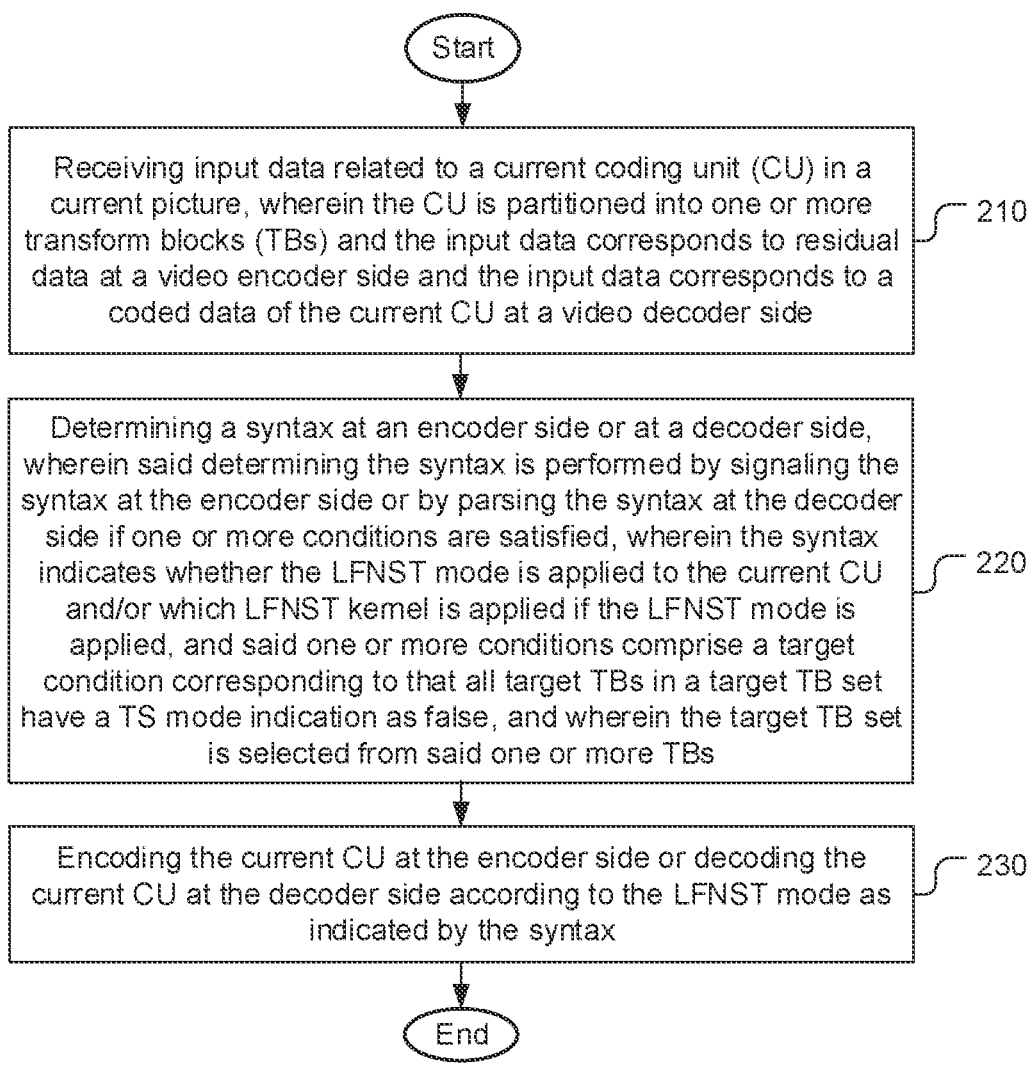
FIG. 2 illustrates a flowchart of an exemplary coding system incorporating restricted LFNST (Low-Frequency Non-Separable Transform) signaling according to an embodiment of the present invention.

FIG. 2 illustrates a flowchart of an exemplary encoding/decoding system incorporating restricted LFNST (Low-Frequency Non-Separable Transform) signaling/parsing according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data related to a current coding unit (CU) in a current picture are received in step 210, where the CU is partitioned into one or more transform blocks (TBs) and the input data corresponds to residual data at a video encoder side and the input data corresponds to a coded data of the current CU at a video decoder side. A syntax is determined at an encoder side or at a decoder side in step 220, where said determining the syntax is performed by signaling the syntax at the encoder side or by parsing the syntax at the decoder side if one or more conditions are satisfied. The syntax indicates whether the LFNST mode is applied to the current CU and/or which LFNSF kernel is applied when the LFNSF mode is applied, and the conditions comprise a target condition corresponding to that all target TBs in a target TB set have a TS mode indication as false, and the target TB set is selected from the TBs in the current CU. The current CU is encoded at the encoder side or decoded at the decoder side according to the LFNST mode as indicated by the syntax in step 230.

The flowchart shown is intended to illustrate an example of video encoding/decoding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention. Embodiment of the present invention as described above may be implemented in a video encoder and a video decoder. The components of the video encoder and video decoder may be implemented by hardware components, one or more processors configured to execute program instructions stored in a memory, or a combination of hardware and processor. For example, a processor executes program instructions to control receiving of input data associated with a video sequence including a current block in a current picture. The processor is equipped with a single or multiple processing cores. In some examples, the processor executes program instructions to perform functions in some components in the encoder and the decoder, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for encoding or decoding a video sequence, wherein a Low-Frequency Non-Separable Transform (LFNST) mode and Transform Skip (TS) mode are supported, the method comprising:
receiving input data related to a current coding unit (CU) in a current picture, wherein the CU is partitioned into one or more transform blocks (TBs) and the input data correspond to residual data at a video encoder side or a coded data of the current CU at a video decoder side;
determining a syntax at an encoder side or at a decoder side, wherein said determining the syntax is performed by signaling the syntax at the encoder side or by parsing the syntax at the decoder side if one or more conditions are satisfied, wherein the syntax indicates whether the LFNST mode is applied to the current CU and/or which LFNST kernel is applied if the LFNST mode is applied, and said one or more conditions comprise a target condition corresponding to that all target TBs in a target TB set have a TS mode indication among more than one color components as false, and wherein the target TB set is selected from said one or more TBs; and
encoding the current CU at the encoder side or decoding the current CU at the decoder side according to the LFNST mode as indicated by the syntax.

2. The method of claim 1, wherein in a luma splitting tree, the current CU corresponds to a luma coding block, and the target TB set corresponds to one or more luma TBs.

3. The method of claim 1, wherein in a chroma splitting tree, the current CU corresponds to one or more chroma coding blocks, and the target TB set corresponds to one or more chroma TBs.

4. The method of claim 1, wherein in a single splitting tree, the current CU corresponds to one luma coding block and one or more chroma coding blocks, and the target TB set corresponds to one or more luma TBs and one or more chroma TBs.

5. The method of claim 1, wherein the current CU corresponds to either one luma coding block or one or more chroma coding blocks, and the target TB set corresponds to one or more TBs for all components in the current CU.

6. The method of claim 1, wherein the target TB set corresponds to one or more first TBs for each coding block in the current CU.

7. The method of claim 1, wherein a variable is used to record whether to signal or parse the syntax for the LFNST mode.

8. The method of claim 1, wherein the syntax is inferred as the LFNST mode not applied to the current CU when the TS mode indication is true.

9. The method of claim 1, wherein the LFNST mode is not used for a TB in the current CU if the syntax designated as LFNST index for the current CU is equal to zero, and wherein the LFNST index with a value greater than zero indicates one of low-frequency transform matrices selected.

10. An apparatus for encoding or decoding a video sequence, wherein a Low-Frequency Non-Separable Transform (LFNST) mode and Transform Skip (TS) mode are supported, the apparatus comprising one or more electronic circuits or processors arranged to:
receive input data related to a current coding unit (CU) in a current picture, wherein the CU is partitioned into one or more transform blocks (TBs) and the input data correspond to residual data at a video encoder side or a coded data of the current CU at a video decoder side;
determining a syntax at an encoder side or at a decoder side, wherein said determining the syntax is performed by signaling the syntax at the encoder side or by parsing the syntax at the decoder side if one or more conditions are satisfied, wherein the syntax indicates whether the LFNST mode is applied to the current CU and/or which LFNST kernel is applied if the LFNST mode is applied, and said one or more conditions comprise a target condition corresponding to that all target TBs in a target TB set have a TS mode indication among more than one color components as false, and wherein the target TB set is selected from said one or more TBs; and
encode the current CU at the encoder side or decode the current CU at the decoder side according to the LFNST mode as indicated by the syntax.

11. The apparatus of claim 10, wherein in a luma splitting tree, the current CU corresponds to a luma coding block, and the target TB set corresponds to one or more luma TBs.

12. The apparatus of claim 10, wherein in a chroma splitting tree, the current CU corresponds to one or more chroma coding blocks, and the target TB set corresponds to one or more chroma TBs.

13. The apparatus of claim 10, wherein in a single splitting tree, the current CU corresponds to one luma coding block and one or more chroma coding blocks, and the target TB set corresponds to one or more luma TBs and one or more chroma TBs.

14. The apparatus of claim 10, wherein the current CU corresponds to either one luma coding block or one or more chroma coding blocks, and the target TB set corresponds to one or more TBs for all components in the current CU.

15. The apparatus of claim 10, wherein the target TB set corresponds to one or more first TBs for each coding block in the current CU.

16. The apparatus of claim 10, wherein a variable is used to record whether to signal or parse the syntax for the LFNST mode.

17. The apparatus of claim 10, wherein the syntax is inferred as the LFNST mode not applied to the current CU when the TS mode indication is true.

18. The apparatus of claim 10, wherein the LFNST mode is not used for a TB in the current CU if the syntax designated as LFNST index for the current CU is equal to zero, and wherein the LFNST index with a value greater than zero indicates one of low-frequency transform matrices selected.

19. The method of claim 1, wherein the target condition corresponding to that all target TBs in a target TB set have the TS mode indication as false for each of said more than one color components.

* * * * *